(12) United States Patent
McDermott (10) Patent No.: US 6,584,587 B1
(45) Date of Patent: Jun. 24, 2003

(54) WATCHDOG METHOD AND APPARATUS

(75) Inventor: Michael Donald McDermott, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/418,964

(22) Filed: Oct. 14, 1999

(51) Int. Cl.$^7$ .............................................. G06F 11/00
(52) U.S. Cl. ......................................... 714/55; 714/23
(58) Field of Search ............................. 714/51, 55, 23, 714/2, 47, 38

(56) References Cited

U.S. PATENT DOCUMENTS

| | | | | |
|---|---|---|---|---|
| 3,566,368 A | * | 2/1971 | Blauw | 714/51 |
| 4,117,459 A | * | 9/1978 | Douglas et al. | 714/55 |
| 4,689,766 A | * | 8/1987 | Kent | 714/23 |
| 4,716,588 A | * | 12/1987 | Thompson et al. | 380/222 |
| 4,872,110 A | * | 10/1989 | Smith et al. | 714/55 |
| 5,027,358 A | * | 6/1991 | O'Dell et al. | 714/55 |
| 5,204,955 A | * | 4/1993 | Kagei et al. | 709/223 |
| 5,440,725 A | * | 8/1995 | Weller et al. | 714/55 |
| 5,560,033 A | * | 9/1996 | Doherty et al. | 713/340 |
| 5,631,698 A | * | 5/1997 | Lee | 348/178 |
| 5,655,083 A | * | 8/1997 | Bagley | 714/23 |
| 5,715,386 A | * | 2/1998 | Fulton et al. | 714/15 |
| 5,768,620 A | * | 6/1998 | Johnson et al. | 710/15 |
| 5,802,271 A | * | 9/1998 | Hashimoto et al. | 714/44 |
| 5,841,969 A | * | 11/1998 | Fye | 714/51 |
| 6,018,759 A | * | 1/2000 | Doing et al. | 709/108 |
| 6,154,859 A | * | 11/2000 | Norizuki et al. | 714/47 |
| 6,173,339 B1 | * | 1/2001 | Yorimitsu | 710/260 |
| 6,173,417 B1 | * | 1/2001 | Merrill | 370/216 |
| 6,393,590 B1 | * | 5/2002 | Wood et al. | 710/104 |

OTHER PUBLICATIONS

Valerie J. Easton and John H. McColl, "Random Sampling", Sep. 1997, <http://www.stats.gla.ac.uk/steps/glossary/sampling.html#randsamp> [May 6, 2002].*

* cited by examiner

Primary Examiner—Robert Beausoliel
(74) Attorney, Agent, or Firm—Blakely Sokoloff Taylor & Zafman LLP

(57) ABSTRACT

A watchdog method and apparatus for a processing system running one or more tasks for controlling one or more subsystems is described. In one embodiment, the watchdog method configures a reset controller to cause a hardware reset to the one or more subsystems in a predetermined time, and registers one or more tasks in a task table. The method calls a first task in the table and changes a status of the first task to called. For each task in the table, the method determines the status of the task, and, if the status is called, sets a flag to a true state if a second predetermined time has passed since the task was called and a response message has not been received from the called task. The method configures the device to push back the occurrence of the hardware reset to the predetermined time if the flag is not set to the true state. A next task in the table is then called, and its status changed to called. The method again determines the status of each task in the table, and so on.

25 Claims, 6 Drawing Sheets

FIG. 2

| INDEX | TASK NAME & I.D. | STATUS | TIME CALLED | TIMEOUT VALVE | MISC. |
|---|---|---|---|---|---|
| 1 | TASK 1 | | $T_1$ | $PT_1$ | |
| 2 | TASK 2 | | $T_2$ | $PT_2$ | |
| 3 | TASK 3 | | $T_3$ | $PT_3$ | |
| ... | | | ... | | |
| N | TASK N | | $T_N$ | $PT_N$ | |

WATCHDOG METHOD AND APPARATUS

BACKGROUND OF THE INVENTION

1. Field of the Invention

The present invention relates generally to the field of processing systems and, more particularly, to a watchdog method and apparatus in such processing systems.

2. Background Information

In a complex electronic system that includes multiple subsystems, one or more of the subsystems may fail or operate in a reduced capacity, thereby affecting the performance of the overall system. In such a situation, the failed subsystem(s) may cause the entire system to "lock up" or "freeze". User intervention is then typically required to reset the entire system. Furthermore, the one or more failed subsystems may enhance the risk of damage or even fire to the system.

Accordingly, there is a need in the technology for a method and apparatus to reduce such effects.

SUMMARY OF THE INVENTION

The present invention comprises a watchdog method and apparatus for a processing system running one or more tasks for controlling one or more subsystems. In one embodiment, the method includes configuring a device to cause a hardware reset to the one or more subsystems in a predetermined time, and calling a first task in a table and changing a status of the first task to called. For one or more tasks in the table, the method determines the status of the task, and, if the status is called, sets a flag to a true state if a second predetermined time has passed since the task was called and has not replied. If the flag is not set to the true state, the method configures the device to push back the occurrence of a hardware reset to the predetermined time. A next task in the table is then called, and its status is changed to called.

Other embodiments are described and claimed herein.

DETAILED DESCRIPTION

The present invention comprises a watchdog method and apparatus for a processing system running one or more tasks for controlling one or more subsystems. In one embodiment, the method includes (a) configuring a device to cause a hardware reset to the one or more subsystems in a predetermined time, and (b) calling a first task in a table and changing a status of the first task to called. The method also includes (c) for one or more tasks in the table, determining the status of the task, and, if the status is called, sets a flag to a true state if a second predetermined time has passed since the task was called and has not replied. The method further includes (d) configuring the device to push back the occurrence of a hardware reset to the predetermined time if the flag is not set to the true state, and (e) calling a next task in the table, and changing its status to called. The method then jumps back to (c).

Herein, various terms are used to describe certain elements or characteristics of the present invention. For example, a "communication line" is broadly defined as any communication path between a source and a destination. The communication line may include one or more information-carrying lines (electrical wire, fiber optics, cable, etc.) or wireless communications through established techniques such as infrared (IR) and radio frequency (RF) signaling. A "signal" is construed as information transmitted in a parallel or serial manner. A "task module" is broadly defined as a piece of software for controlling and/or monitoring a device or subsystem (e.g., a piece of hardware), or for controlling and/or monitoring other software modules.

Figure 1:
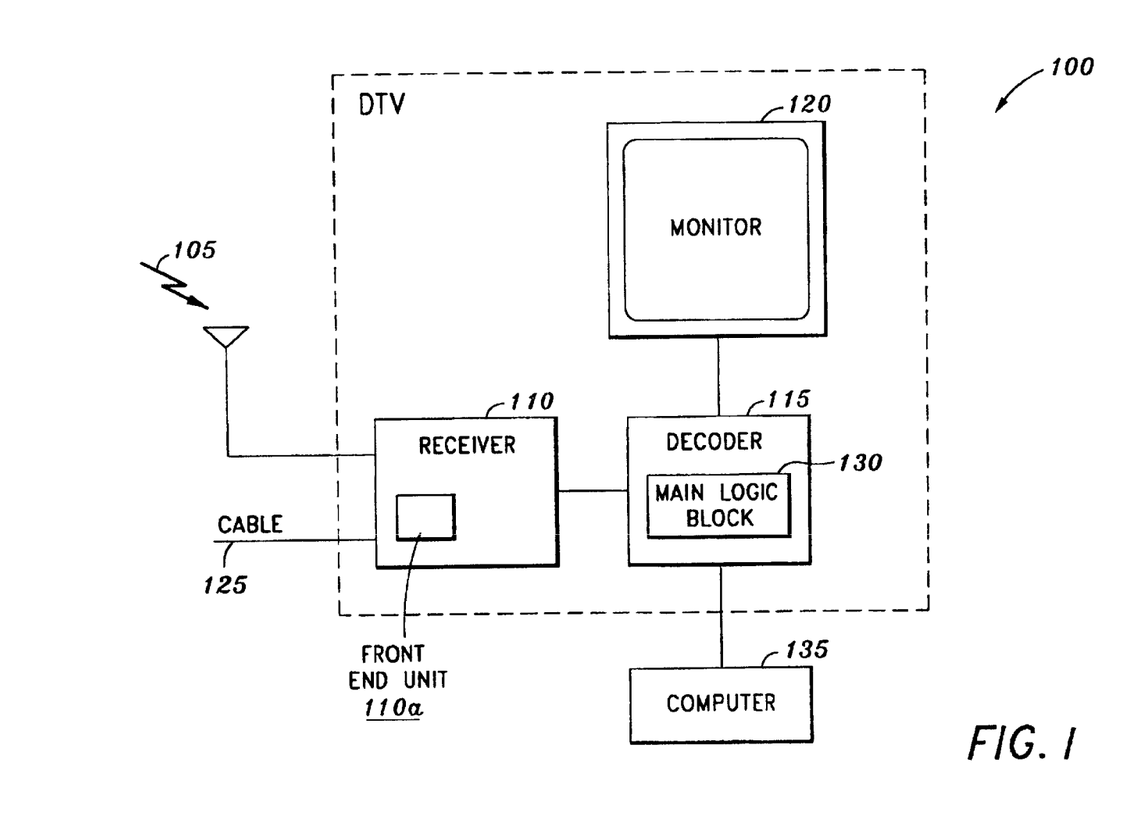
FIG. 1 illustrates one embodiment of a system utilizing the present invention.

Referring to FIG. 1, one embodiment of a system utilizing the present invention is shown. The system 100 comprises an antenna 105, a broadcast receiver 110, a decoder 115 and a monitor 120. In one embodiment, the receiver 110 and the decoder 115 may be a single unit, and may be implemented as an integrated receiver decoder (IRD). The broadcast receiver 110, in general, receives a broadcast and performs operations on the broadcast signal to produce digital information. The digital information is decoded and dispatched to the monitor 120 for display. Alternatively, the broadcast receiver 110 may receive a digital broadcast signal (for example, a digital bit stream) from a digital source via a cable 125. Although the IRD may be implemented as the broadcast receiver in one embodiment, other types of broadcast receivers may be used such as a cable box for a Cable Broadcasting System, an Internet terminal, a digital television (DTV), and the like.

Antenna 105 may receive the digital bit stream from an orbiting satellite (not shown) and routes the bit stream to receiver 110. The bit stream is formatted in accordance with any video compression function and is usually encrypted under either a symmetric key cryptographic function or a public-key cryptographic function. Typically, the bit stream includes sensory data (e.g., video and/or audio, or communication data) and control information for a number of shows. The control information for each show includes programming data having the following content: date of broadcast, broadcast channel number, show start-time, show end-time, and also show title.

The decoder 115 is responsible for decoding the bit stream, for storing programming data, for executing software stored in the processing unit 130 located within the decoder 115, and for processing the decoded bit stream to produce one or more output signals having appropriate formats. As shown, an output signal is placed in an analog format and sent to monitor 120 for viewing. The output signal may also be sent to a recording device (not shown) for recording. The analog format may be in accordance with a video format established by National Television Systems Committee (NTSC), or perhaps other video formats, including but is not limited or restricted to Phase Alternating Line (PAL), Sequential Couleur Avec Memoire (SECAM) and other recognized formats. In one embodiment, the decoder 110 may be coupled to a computer 135 for diagnostic/debugging purposes. The computer 135 may be decoupled when the diagnostic procedures are complete.

In one embodiment, the receiver 110 includes a front-end unit 110a. The antenna 105 transfers the bit stream to the front-end unit 110a. Although not shown, the front-end unit 110a includes (i) amplification circuitry used to amplify any relatively weak signals received at antenna 105, and (ii) a tuner which allows a user to receive a desired broadcast channel. The resulting signal is then forwarded to the decoder 115.

Additionally, the receiver 110 is responsible for responding to a plurality of commands from a remote control (not shown). The remote control may include any type of remote control, including one described in U.S. Pat. No. 5,453,758 assigned to Sony Corporation of Tokyo, Japan. Examples of commands from the remote control include commands causing receiver 110 to tune to a particular channel, or for performing a mute operation.

Figure 2:
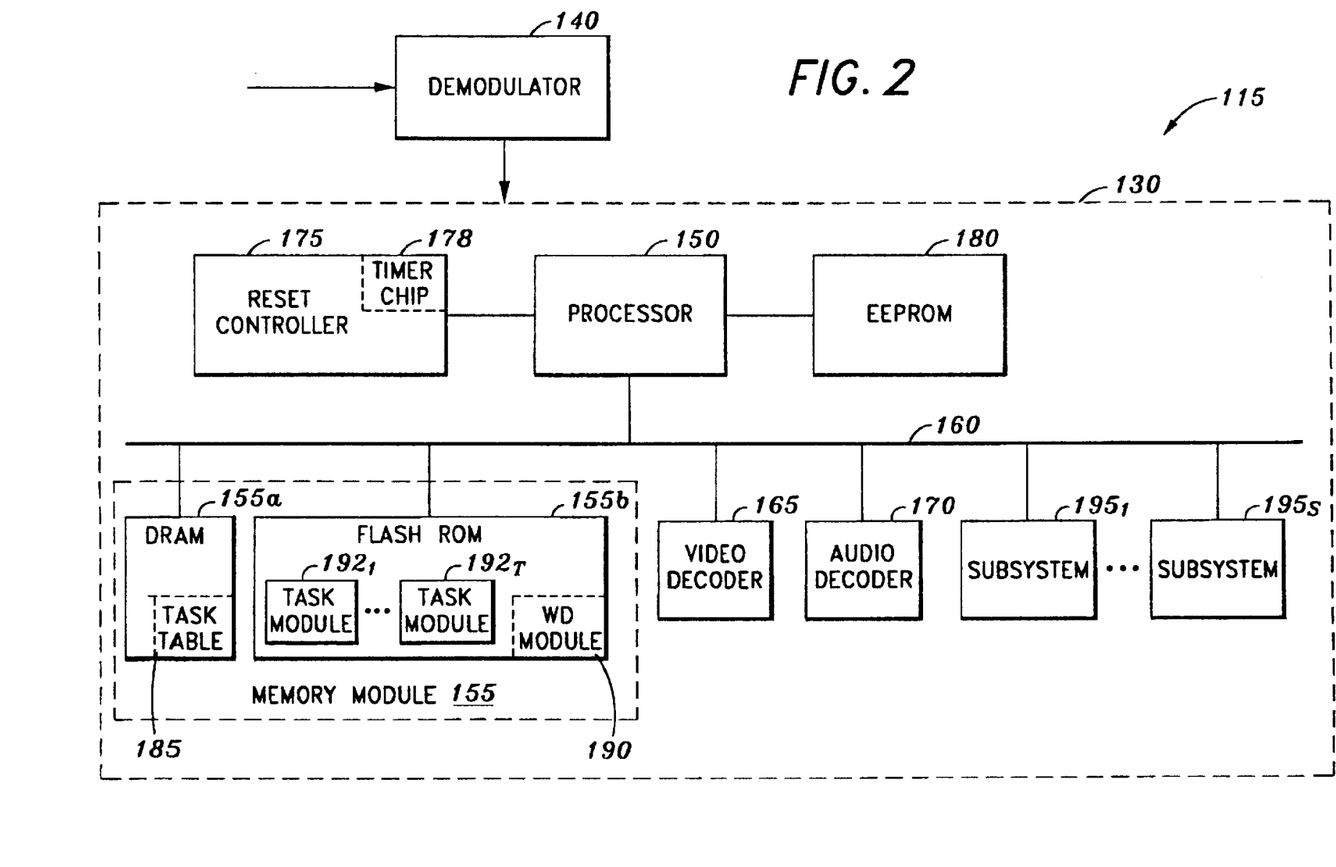
FIG. 2 illustrates one embodiment of the decoder of FIG. 1.

FIG. 2 illustrates one embodiment of the decoder 115 of FIG. 1. For the case where the user wishes to view a show provided by a broadcaster, the bit stream associated with the desired broadcast channel is routed from front-end unit 110$a$ to a demodulator 140 located within decoder 115. In demodulator 140, the bit stream is initially processed before transferring to a main logic block 130 for further processing. Such initial processing may include exposing the bit stream to Vestigial Side Band (VSB) demodulation, viterbi-decoding, de-interleaving and Reed-Solomon decoding.

In certain situations, decoder 115 is connected to other peripheral devices such as digital VCRs, digital video disk players, digital laser disk players and the like. These digital-input peripheral devices communicate with a processor within main logic block 130.

FIG. 2 also illustrates one embodiment of the main logic block 130. As shown, the main logic block 130 comprises a processor 150 that is coupled to a memory module 155 via a system bus 160. The processor 150 includes any one of the ×86, Pentium™, Pentium II™, and Pentium Pro™ microprocessors as marketed by Intel™ Corporation, the K-6 microprocessor as marketed by AMD™, or the 6×86MX microprocessor as marketed by Cyrix™ Corp. Further examples include the Alpha™ processor as marketed by Digital Equipment Corporation™, the 680×0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing processor 150. The processor 150 is not limited to microprocessor but may take on other forms such as microcontrollers, digital signal processors, reduced instruction set computers (RISC), application specific integrated circuits, and the like.

The memory module 155 includes a DRAM 155$a$ and a FLASH Read Only Memory (ROM) 155$b$. In one embodiment, the DRAM 155$a$ contains a task table 185 together with other data. In one embodiment, the FLASH ROM 155$b$ contains a watchdog module (WD module) 190, one or more task modules $192_1$–$192_T$ (where "T" is a positive whole number), and other software code. Alternatively, the watchdog module 190 and/or the task modules $192_1$–$192_T$ are copied into DRAM 155$a$ during boot-up. The watchdog module 190 and the task modules $192_1$–$192_T$ are executed by the processor 150.

The main logic block 130 further comprises a video decoder 165 and an audio decoder 170, each of which is coupled to the processor 150 via the system bus 160. The video and audio decoders 165 and 170 perform video and audio functions, respectively. That is, the video decoder 165 decodes the video components of the incoming bit stream while the audio decoder 170 decodes the audio components of the incoming bit stream. In addition, a plurality of other subsystems $195_1$–$195_S$ (where "S" is a positive whole number) are coupled to the system bus 160 for performing other functions in the main logic block 130. The task modules $192_1$–$192_T$ are software modules that control the hardware devices in the logic block 130 (e.g., the video and audio decoders 165 and 170, and subsystems $195_1$–$195_S$), and other software modules for coordination of the system 100. For example, task module $192_1$ controls the video decoder 165, task module $192_2$ controls the audio decoder 170, task module $192_3$ controls subsystem $195_1$, and so on. Task modules may also be used to interface with other software modules in the logic block 130.

The main logic block 130 further comprises a reset controller 175 that is coupled to the processor 150. The reset controller 175 includes a timer chip 178. Alternatively, the timer chip 178 may be integrated as part of the processor 150. When configured and operational, the timer chip 178 causes the reset controller 175 to reset the receiver 110, decoder 115, and/or monitor 120 in the system 100 when its configured time expires. An EEPROM 180 is also coupled to the processor 150. The EEPROM 180 is for storing tables used for tuning, as well as other data.

During operation, the watchdog module 190 communicates with the task modules $192_1$–$192_T$ to determine the status of the video decoder 165, audio decoder 170, subsystems $195_1$–$195_S$, and/or other software modules in the system 100. The communication involves transmitting a call message to a task module (or task) and waiting for a reply message from the called task. One main function of the watchdog module 190 is to continually determine the status of the tasks, such that when a task is delinquent in responding back, the watchdog module 190 will not reset or "push back" the time of the timer chip 178. Consequently, the timer chip 178 will inevitably expire, causing the reset controller 175 to reset the receiver 110, decoder 115, and/or monitor 120. By continually monitoring the status of the tasks, the watchdog module 190 prevents the receiver 110, decoder 115, and/or monitor 120, or subsystems of such devices from locking up.

Figure 3:
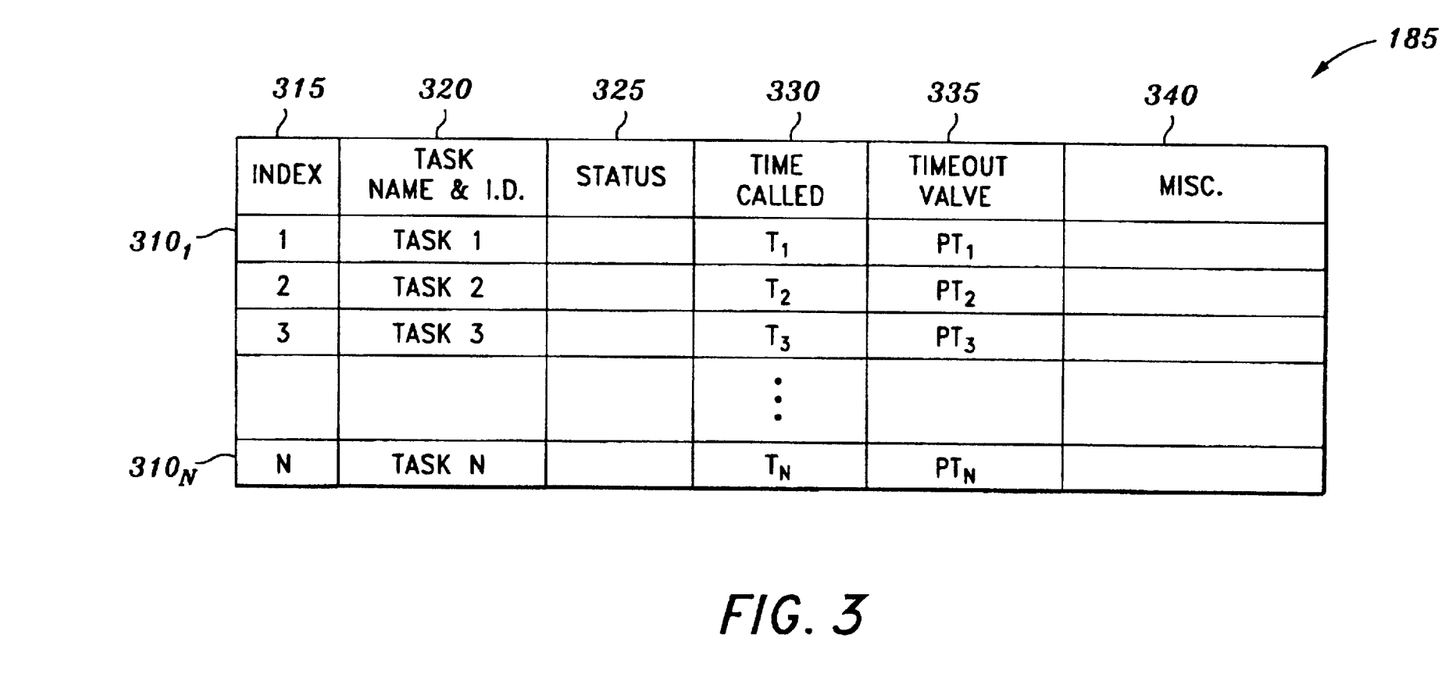
FIG. 3 shows a task table for registering tasks in the system main logic block 130, according to one embodiment of the present invention.

FIG. 3 shows an exemplary embodiment of the task table 185 of FIG. 2. In one embodiment, the task table 185 is contained in DRAM 155$a$ and administered by the watchdog module 190 (FIG. 2). Alternatively, the task table 185 may be contained in FLASH ROM 155$b$, and copied into DRAM 155$a$. The task table 185 is used by the watchdog module 190 to register and maintain the status of task modules (tasks).

Referring to FIG. 3, the task table 185 includes one or more entries $310_1$–$310_N$ (where "N" is a positive whole number) created and maintained for the one or more tasks that are registered with the watchdog module 190. In one embodiment, each entry includes (i) field 315 containing the index number of the task, (ii) field 320 containing the task name and identification (ID), (iii) field 325 containing the status of the task (e.g., REGISTERED, CALLED, REPLIED, etc.), (iv) field 330 containing the time that the task was called (referred to as $T_N$), (v) field 335 containing the predetermined timeout value for the task ($PT_N$), and (vi) field 340 containing other miscellaneous information relating to the task. The predetermined timeout value ($PT_N$) may be different for one task to another depending on the function of the task and/or other factors.

Figure 4A:
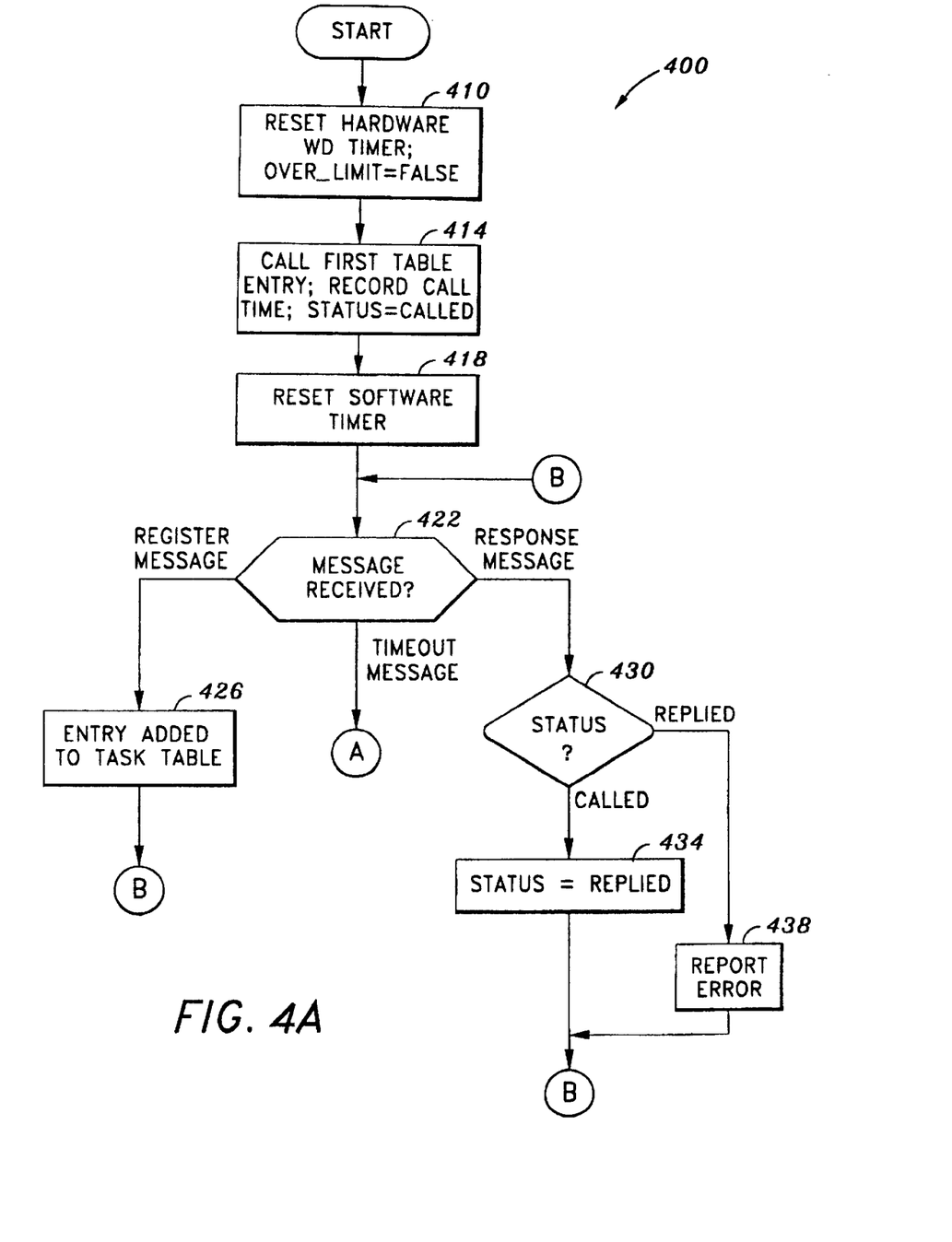
FIGS. 4A–4C illustrate a flow diagram of a watchdog module, according to one embodiment of the present invention.
Figure 4B:
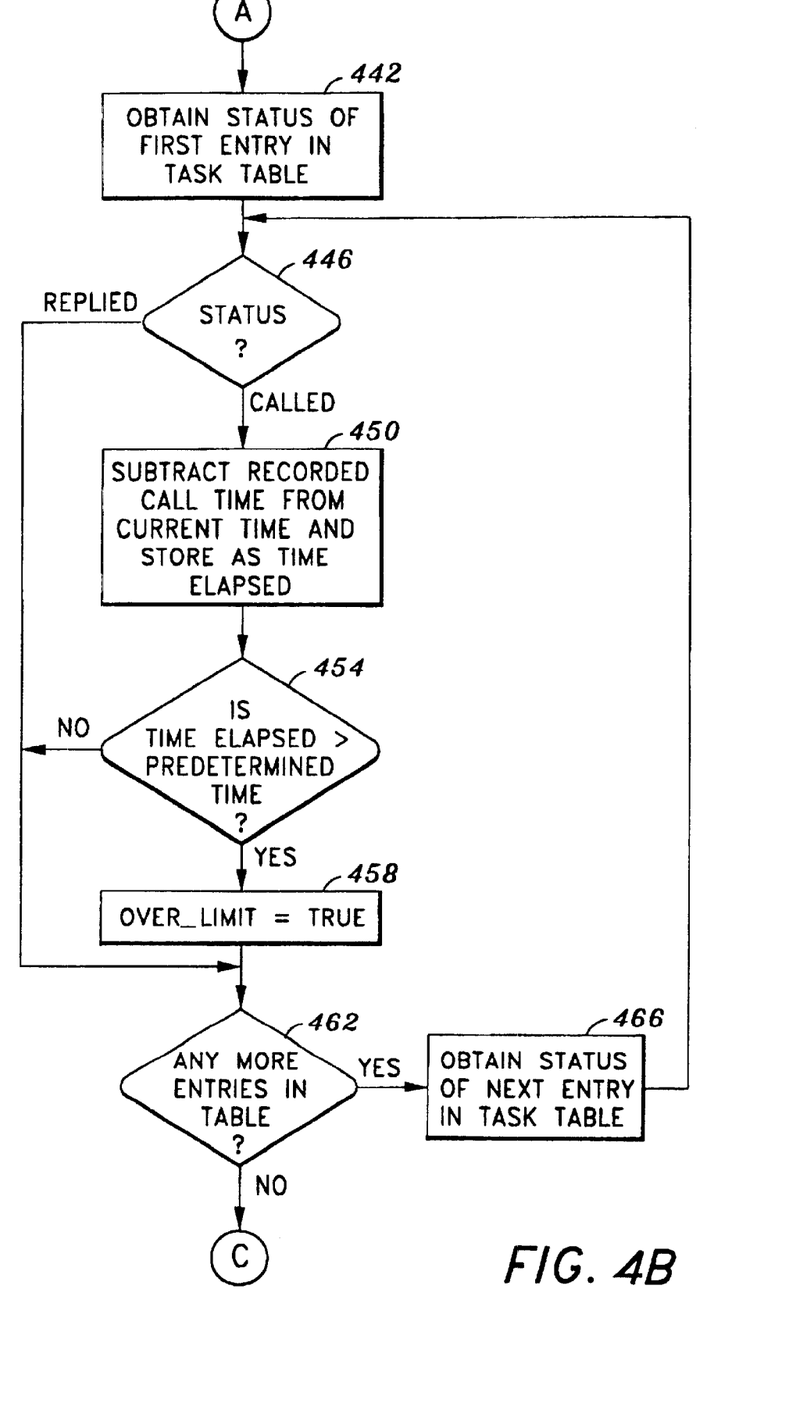
Figure 4C:
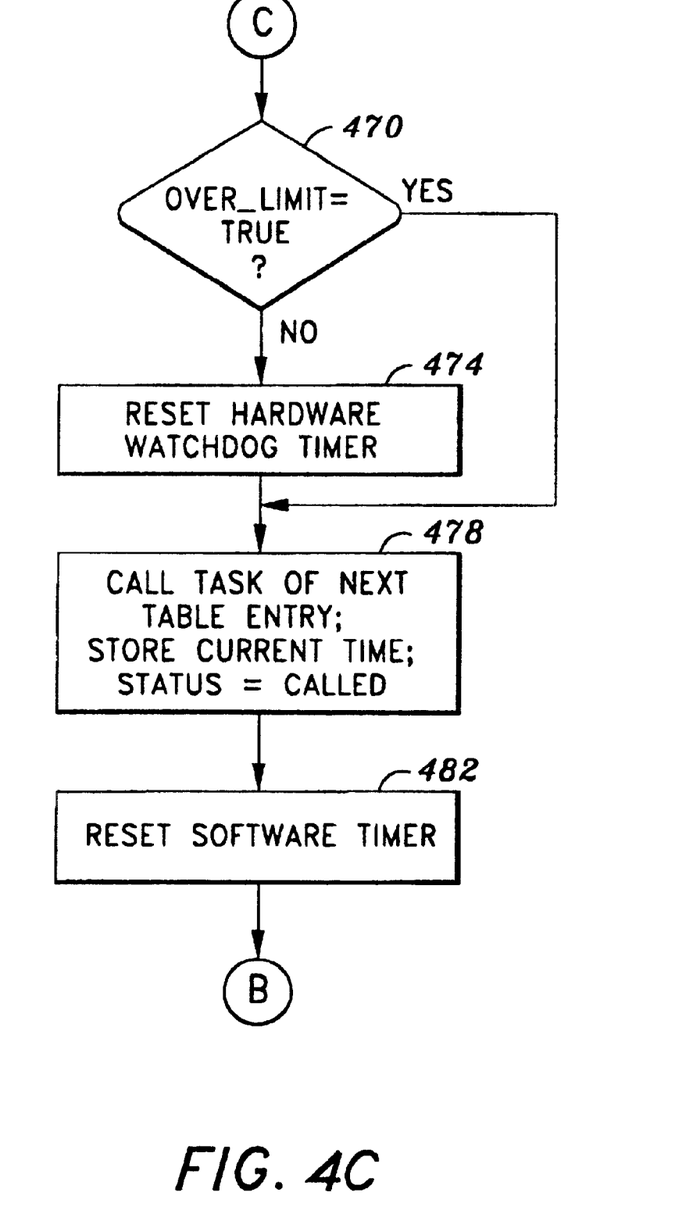

FIGS. 4A–4C illustrate a flow diagram of a watchdog module 400, according to one embodiment of the present invention. The watchdog module 400 is contained in FLASH ROM 155$b$, as shown by numeral 190 (FIG. 2). The watchdog module 400 may be executed by processor 150 directly from FLASH ROM 155b, or may be copied into and executed from DRAM 155a.

Referring to FIG. 4, the watchdog module 400 commences at block 410 where the timer chip 178 (FIG. 2) is configured to a predetermined hardware timeout value. If the timer chip 178 expires, before being set again by the watchdog module 400, the reset controller 175 causes a hardware reset of the receiver 110, decoder 115, and/or monitor 120. In addition, at block 410, a variable OVER_LIMIT is initialized to FALSE. At block 414, the watchdog module 400 calls the first task in the task table 185, records the current time for the first task (T1) in field 330, and changes the status in field 325 to CALLED. At block 418, the module 400 sets a software timer to a predetermined software timeout value. In one embodiment, the predetermined software timeout value is smaller than the predetermined hardware timeout value. The software timer is used by the module 400 to check the status of the tasks, when the timer times out.

Once the software timer is set, the module 400 moves to block 422 and waits for a message, either from a task or from the software timer, in the case of a software timeout. The message may be a registration message from a task that has not yet registered with the watchdog module 400. In such a case, the module 400 moves to block 426 where a new entry 310 is created in the task table 185 for the task requesting registration. The timeout value in field 335 may be set by the registering task (e.g., in the registration message) or may be set by the module 400. Once the new task is registered, the module 400 moves back to block 422 and waits for another message.

At block 422, if the message is a response message from a task that has been previously called, the module 400 moves to block 430. At block 430, if the status of the task (field 325) that sent the response message is CALLED, the module moves to block 434, where the status in field 325 is changed to REPLIED. However, if at block 430, the status was REPLIED, the module moves to block 438 where an error is reported. This is because a task should not be sending a response message if it has not been called (e.g., its status is replied). The watchdog module 400 may optionally store the reported error in an error table in DRAM 155a or FLASH ROM 155b for subsequent retrieval by the computer 135 for diagnostic/debugging purposes. In either case, the module moves back to block 422 and waits for a new message.

At block 422, if the message is a timeout message, from the software timer, the module 400 continues to block 442 where the status of the first entry is obtained. At block 446, if the status is CALLED, then the module moves to block 450, where the recorded call time ($T_1$) is subtracted from the current time, and the result is the time elapsed. At block 454, if the time elapsed is greater than (or equal to) the predetermined timeout value ($PT_1$), the module moves to block 458 and the task (task 1) is deemed to be delinquent (i.e., has not responded in time). Consequently, at block 458 the variable OVER_LIMIT is set to TRUE. The delinquency of the task may be optionally recorded in the error table in DRAM 155a or FLASH ROM 155b for diagnostic/debugging purposes. If, at block 446, the status of the task is REPLIED, the task is deemed to be in good standing, and the module moves to block 462. If, at block 454, the predetermined time (PT) is greater than the time elapsed, the task is deemed not to be delinquent, and the module moves to block 462.

At block 462, a determination is made as to whether there are any more unchecked tasks in the task table 185. If so, the process moves to block 466 where the status of a next entry in the task table 185 is obtained. In one embodiment, blocks 446–466 are performed until all the tasks in the task table 185 have been checked. In another embodiment, a random number of tasks are checked when a software timeout occurs.

At block 470, a check of the variable OVER_LIMIT is made. If OVER_LIMIT is FALSE, the module moves to block 474 where the hardware watchdog timer (timer chip 178) is "reset" or "pushed back" (e.g., configured to the predetermined hardware timeout value) to temporarily prevent a hardware reset (until it is "reset" or "pushed back" again). However, if OVER_LIMIT is TRUE, the module 400 jumps over block 474 to block 478. Consequently, the timer chip 178 will inevitably cause a hardware reset. At block 478 a task of a next entry in the task table 185 is called, the current time stored in field 330 of the called task, and the status is changed to CALLED. At block 482, the software timer is again reset to the predetermined software timeout value for eventually causing another software timeout message in order to check the status of the tasks in the task table 185. The process then moves back to block 422.

It must be noted that the present invention is described with respect to a DTV system having multiple tasks, one or more of which may be controlling subsystems in the system. However, other types of systems may benefit from the present invention including, for example, computer systems, automated teller machines, avionics systems, medical instruments, or any system which has the need for lockup recovery to ensure the responsiveness and function of the system over time.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by processor 150 of electrical signals representing data bits and the maintenance of data bits at memory locations in memory module 155, as well as other processing of signals. The memory locations where data bits are maintained are physical locations that have particular electrical, magnetic, optical, or organic properties corresponding to the data bits.

Thus, the present invention may be embodied in one of several forms including a method, an apparatus, and a program product that includes a computer readable medium having embodiment therein computer readable program. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" or "machine-readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The data signal may include any signal that can propagate over a transmission medium such as electronic network channels, optical fibers, air, electromagnetic, RF links, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for a system running one or more tasks for controlling one or more subsystems, comprising:
 (a) configuring a device to cause a hardware reset to the one or more subsystems in a first predetermined time;
 (b) calling a first task in a table, and changing a status of the first task to called;
  (b.1) waiting a third predetermined time before proceeding to (c), said third predetermined time being shorter than said first predetermined time;
 (c) for one or more tasks in the table,
  (c.1) determining a status of a determined task of the one or more tasks,
  (c.2) if the status of the determined task is called, setting a flag to a true state if a second predetermined time has passed since the determined task was called and has not replied;
 (d) if the flag is not set to the true state, configuring the device to push back the occurrence of the hardware reset to the first predetermined time;
 (e) calling a next task in the table, and changing the status of the next task to called; and
 (f) jumping back to (b.1).

2. The method of claim 1 wherein prior to (c), receiving one or more registration messages for registering one or more tasks in the table.

3. The method of claim 1 wherein prior to (c), setting the flag to a false state.

4. The method of claim 1 wherein prior to (f), the method comprises:
 receiving a reply message from one of the one or more tasks registered in the table; and
 changing the status of the task that sent the reply message to replied.

5. The watchdog method of claim 1 wherein after (b.1) and prior to (c), the method comprises:
 receiving a reply message from one of the one or more tasks registered in the table; and
 changing the status of the task that sent the reply message to replied.

6. The watchdog method of claim 1 wherein the one or more tasks are randomly selected.

7. The method of claim 1 wherein the operations of (c) are performed for each task in the table.

8. The method of claim 1, wherein (b) further comprises recording, in an entry of the table, a time when the first task is called.

9. The method of claim 8, wherein the second predetermined time is an elapsed time period being a difference between a current time and the recorded time.

10. The method of claim 1, wherein the second predetermined time is longer in duration than the first predetermined time.

11. The method of claim 1, wherein the determined task is initially the first task.

12. A software module stored in processor readable medium and executed by a processor comprising:
 (a) computer readable program code to configure a device to cause a hardware reset to one or more subsystems in a first predetermined time;
 (b) computer readable program code to call a first task in a table, and change a status of the first task to called;
  (b.1) computer readable program code to wait a third predetermined time before proceeding to (c), the third predetermined time being shorter than the first predetermined time;
 (c) computer readable program code, for one or more tasks in the table, to determine a status of a determined task of the one or more tasks, and, if the status of the determined task is called, set a flag to a true state if a second predetermined time has passed since the determined task was called and has not replied;
 (d) computer readable program code to configure the device to push back the occurrence of the hardware reset to the first predetermined time if the flag is not set to the true state;
 (e) computer readable program code to call a next task in the table, and change the status of the next task to called; and
 (f) computer readable program code to jump to (b.1).

13. The software module of claim 12 wherein prior to (c), the software module further comprising computer readable program code to receive one or more registration messages for registering one or more tasks in the table.

14. The software module of claim 12 wherein prior to (c), the software module further comprising computer readable program code to set the flag to a false state.

15. The software module of claim 12 wherein prior to (f), the software module further comprising computer readable program code to receive a reply message from one of the one or more tasks registered in the table, and change the status of the task that sent the reply message to replied.

16. The software module of claim 12 wherein after (b.1) and prior to (a), the software module further comprising computer readable program code to receive a reply message from one of the one or more tasks registered in the table, and change the status of the task that sent the reply message to replied.

17. The software module of claim 12 wherein (c) comprises computer readable program code, for each task in the table, to determine the status of each of the one or more tasks, and, if the status of any of the one or more tasks in the table is called, set the flag to the true state if the second predetermined time has passed since the task was called and has not replied.

18. The method of claim 12, wherein the determined task is initially the first task.

19. A digital television apparatus, comprising:
 a monitor;
 a receiver for receiving a broadcast signal over a medium, said receiver to amplify and tune a desired broadcast channel; and
 a decoder coupled to the receiver and monitor, said decoder to decode the desired broadcast channel for display on the monitor, said decoder including,
  a memory having one or more instructions,
  a processor coupled to the memory, the processor, in response to the one or more instructions, to,
   (a) configure a device to cause a hardware reset to one or more subsystems of the decoder after a predetermined time has expired,
   (b) call a first task in a table, and change a status of the first task to a called state,
    (b.1) wait a predetermined time before proceeding to (c), the third predetermined time being shorter than the predetermined time, (c) determine, for one or more tasks in the table, a status of a determined task of the one or more tasks after the third predetermined time period has expired, and, if the status is in the called state, set a flag to a true state if a second predetermined time has passed since the determined task was called and has not replied, (d) configure the device to reset the predetermined time if the flag is not set to the true state, (e) call a next task in the table, and change the status of the next task to called, and (f) return to (b.1).

20. The method of claim 19, wherein the determined task is initially the first task.

21. An apparatus, comprising:

a reset controller;

at least one subsystem;

a memory element having one or more instructions; and a processor coupled to the memory element, the reset controller and the at least one subsystem, the processor to (a) configure the reset controller to perform a hardware reset on at least one subsystem after a first time period has elapsed, (b) call a task in a table and change a status of the task to called, (c) wait a second time period being shorter than the first time period before proceeding to (d), (d) for one or more tasks, (i) determine a status of a determined task of the one or more tasks after the second time period has elapsed, (ii) if the status of the determined task is called after a third time period has elapsed, set a flag to a true state, (e) configure the reset controller to reset the first time period if the flag is not set to the true state, (f) call a next task in the table and change the status of the next task to called, and (g) return to (d).

22. The apparatus of claim 21 wherein prior to (c), the processor sets the flag to a false state.

23. The apparatus of claim 21 wherein prior to (f), the apparatus receives a reply message from one of the one or more tasks registered in the table, and changes the status of the task that sent the reply message to REPLIED.

24. The method of claim 21, wherein the determined task is initially the first task.

25. A method comprising:

(a) configuring a device to cause a hardware reset to one or more subsystems in a first predetermined time;

(b) calling a first task in a table, and changing a status of the first task to called;

(c) waiting a third predetermined time before proceeding to (d), said third predetermined time being shorter than said first predetermined time;

(d) for one or more tasks in the table, (d.1) determining a status of each of the one or more tasks including at least the fist task, (d.2) if the status of at least one task of the one or more tasks is called, setting a flag to a true state if a second predetermined time has passed since the at least one task was called and has not replied; and (e) if the flag is not set to the true state, configuring the device to push back the occurrence of the hardware reset to the first predetermined time.

\* \* \* \* \*